Jan. 8, 1963
J. ISREELI
3,072,259
DIALYSIS APPARATUS
Filed Oct. 3, 1958
3 Sheets-Sheet 1
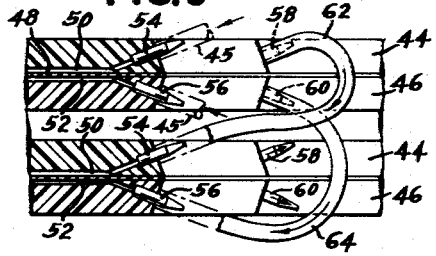
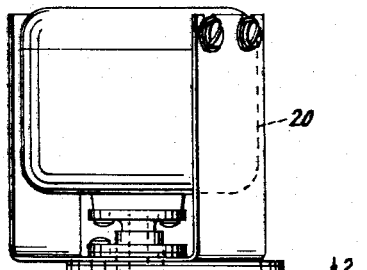
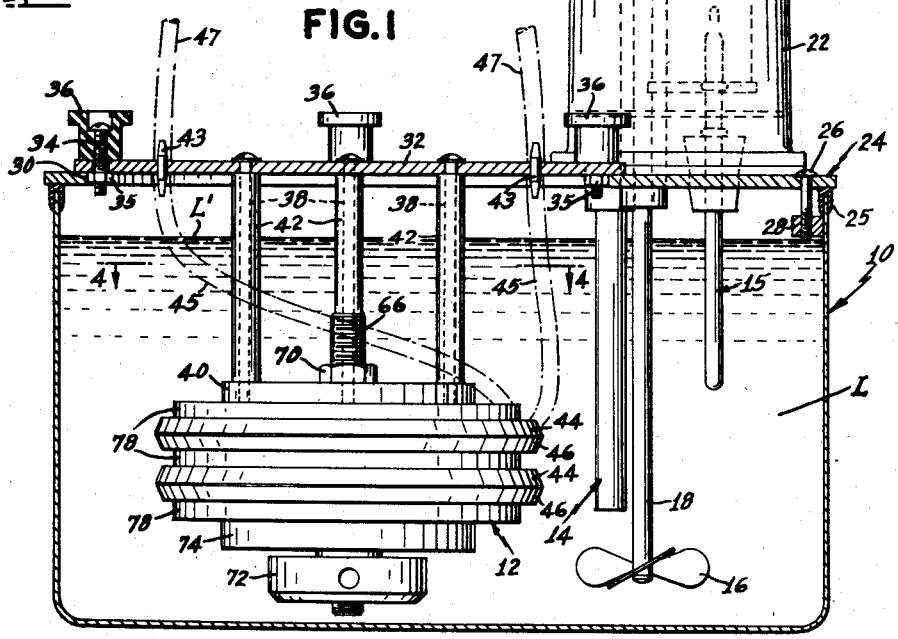
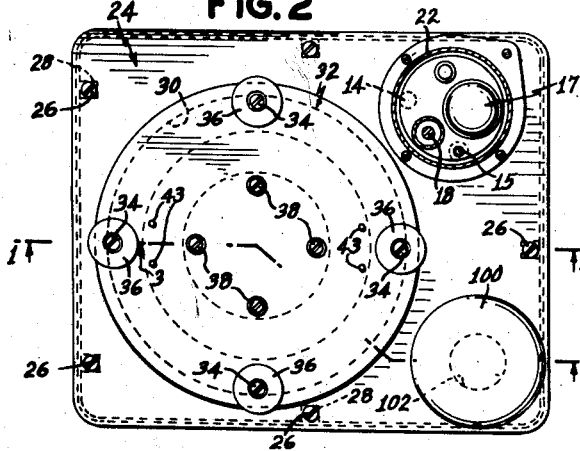
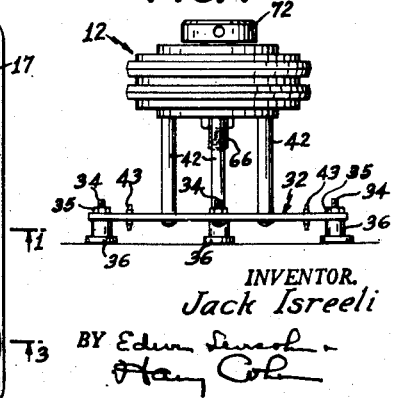
INVENTOR.
Jack Isreeli
BY
ATTORNEYS

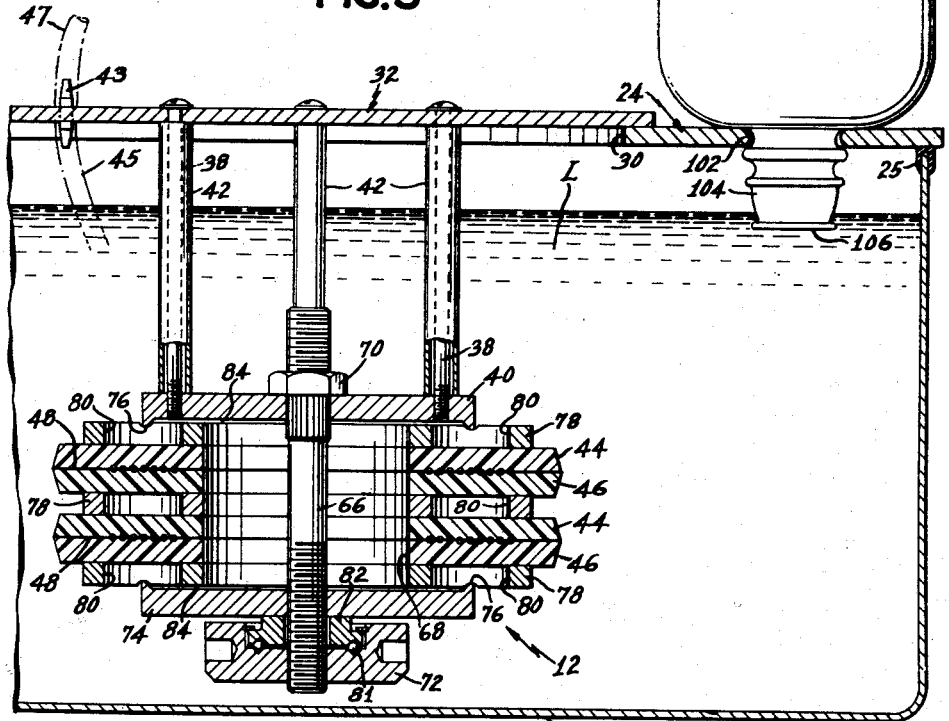

Jan. 8, 1963  J. ISREELI  3,072,259
DIALYSIS APPARATUS
Filed Oct. 3, 1958  3 Sheets—Sheet 3
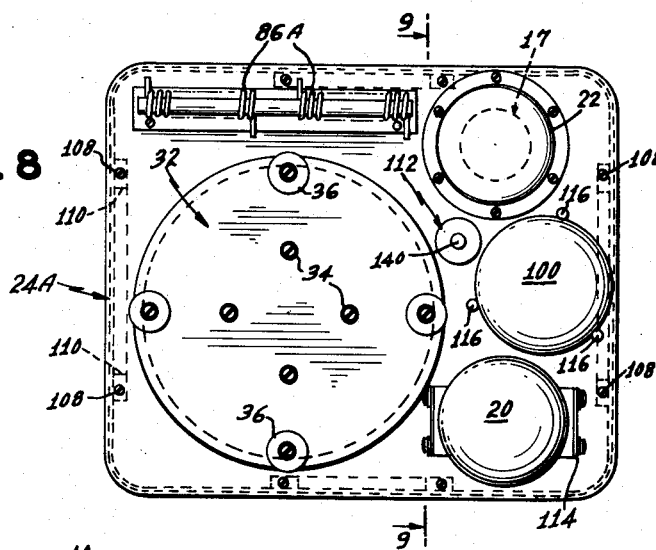
FIG. 8
FIG. 10
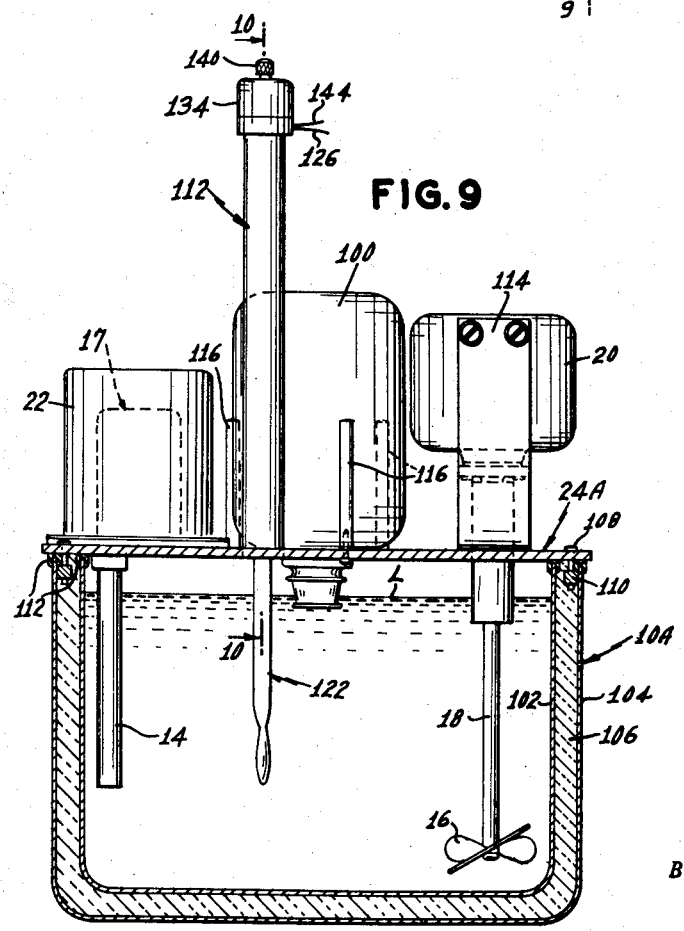
FIG. 9
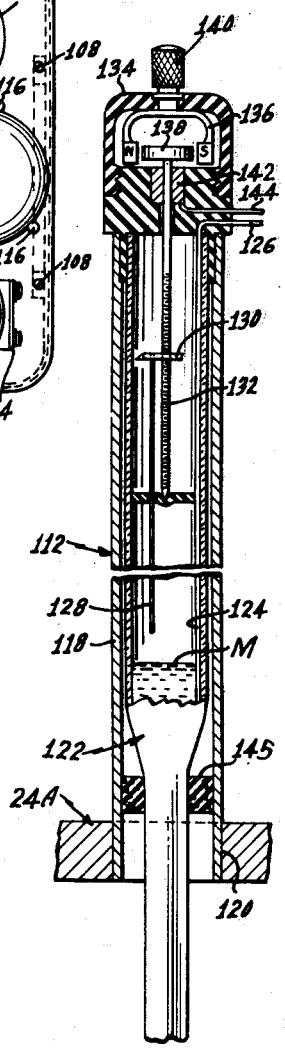
INVENTOR.
Jack Isreeli
BY
ATTORNEYS

United States Patent Office 3,072,259
Patented Jan. 8, 1963

3,072,259
DIALYSIS APPARATUS
Jack Isreeli, Tuckahoe, N.Y., assignor to Technicon Instruments Corporation, Chauncey, N.Y., a corporation of New York
Filed Oct. 3, 1958, Ser. No. 765,203
2 Claims. (Cl. 210—149)

The present invention relates to dialysis apparatus, and more particularly to dialysis apparatus comprising a dialyzer which has provision for the flow of streams of fluids therethrough at opposite sides, respectively, of the membrane of the dialyzer for the diffusion by dialysis of a substance contained in a stream of fluid flowing through the dialyzer at one side of said membrane into a stream of fluid flowing through the dialyzer at the other side of the membrane.

The performance of various methods involving the use of a dialyzer of the above indicated type, for example in analysis, control, monitoring or other operations, is based upon the phenomenon that the quantity of a substance which diffuses through the dialyzer membrane from a stream of liquid flowing through the dialyzer at one side of said membrane into a stream of liquid which flows through the dialyzer at the other side of the membrane is proportional to the quantity of said substance in said first mentioned stream. It is important to maintain a uniform rate of dialysis for such substance, for if the rate of dialysis varies the proportion of the substance which diffuses through the dialyzer membrane varies and on that account said analytical operations may not be as accurate as required in certain cases.

The primary object of the present invention, therefore, is the provision of means operatively associated with a dialyzer for maintaining the rate of dialysis constant for a particular substance to be separated from a stream of liquid by diffusion through the same membrane of a dialyzer, irrespective of variations in ambient temperature during the flow of the fluid streams through the dialyzer, in the operation of the apparatus.

Another object is to provide means for accurately adjusting the temperature at which the dialysis operation takes place.

A further object is to provide means for maintaining the dialyzer membrane in moist condition throughout its area including its clamped marginal edge portions and thus prolonging the useful life of the membrane.

A further object of the invention is to provide means simple in construction and reliable in operation to assure the operation of the dialyzer at a constant predetermined temperature irrespective of variations in ambient temperature, namely variations in the temperature of the room or part of the room or laboratory in which the apparatus is located during the operation thereof.

The above and other objects, features and advantages of the present invention will be fully understood from the following description considered in connection with the accompanying drawings which are illustrative of the presently preferred mode of practicing this invention.

In the drawings:

FIG. 1 is a vertical sectional view, taken on the line 1—1 of FIG. 2 and on a larger scale, of a dialysis apparatus embodying the present invention;

FIG. 2 is a top plan view of the apparatus as observed from the line 2—2 of FIG. 1;

FIG. 3 is a fragmentary sectional view of the apparatus, on a larger scale, on the line 3—3 of FIG. 2;

FIG. 4 is a horizontal plan view on the line 4—4 of FIG. 1, a part of one of the dialyzer plates being cut away for the purposes of illustration;

FIG. 5 is a fragmentary end elevational view of part of the apparatus as viewed from the arrow 5 of FIG. 4;

FIG. 6 is a sectional view on a larger scale on the line 6—6 of FIG. 4;

FIG. 7 is a side view, in elevation, of the dialyzer and its support, removed from the casing of the apparatus and disposed in inverted position;

FIG. 8 is a top plan view similar to FIG. 2 illustrating the provision for adjusting the temperature at which the dialysis operation is performed;

FIG. 9 is a view partly in elevation and partly in section on the line 9—9 of FIG. 8; and FIG. 10 is a sectional view on a larger scale on the line 10—10 of FIG. 9.

Referring now to the drawings in detail, the dialyzer apparatus of the present invention comprises a receptacle 10 adapted to contain a body of water or other liquid L in which the dialyzer 12 is completely immersed. An electric heater 14 of any suitable construction is also immersed in the body of liquid for heating the latter to a predetermined temperature, and said heater is operable under the control of a thermostat 15 for maintaining said liquid at a constant predetermined temperature. Any suitable thermostatic device may be employed but as indicated in FIGS. 1 and 2, the thermostat 15 controls the operation of a relay 17 which, in turn, controls the circuit of heater 14. A stirrer 16 provided at the lower end of a rotary shaft 18 operated by an electric motor 20 serves to maintain the liquid L in a state of turbulence during the operation of the apparatus and is thereby effective in conjunction with the heater 14 to maintain the liquid L at a substantially uniform temperature in the vicinity of the various parts of the dialyzer 12 and the devices associated therewith so that the various parts of the dialyzer are maintained at substantially the same predetermined temperature according to the control of the heater 14 by said thermostatic device. The heater 14, the thermostatic device 15, 17 and the motor 20 are supported by a bracket 22 mounted on the receptacle cover 24. However, said heater and thermostatic device may be mounted on cover 14 at any available place independently of motor bracket 22. A resilient gasket 25 which is U-shaped in cross section is interposed between the upper edge of receptacle 10 and its cover 24 for providing a fluid-tight joint between the receptacle and said cover. A plurality of screws 26 pass through said cover and are threaded into companion bosses 28 on the upper inner wall portion of the receptacle for securing said cover in position.

Cover 24 is provided with a circular opening 30 through which the dialyzer 12 and the parts assembled as a unit therewith in the interior of the receptacle may be inserted and removed. Said dialyzer is supported by plate 32 which also constitutes a cover for said opening 30. As illustrated in FIG. 1, the marginal edge portion of plate 32 rests on the upper marginal surface of cover plate 24 around opening 30. Cover plate 32 is provided with a plurality of circumferentially spaced bolts 34 by which the resilient rubber members 36, hereinafter more particularly described, are secured in position. The nuts 35 on the inner end portions of said bolts are positioned adjacent the inner edge of cover 24 which defines the opening 30 therein and serves to prevent displacement of cover plate 32 in its own plane when said cover plate rests on cover 24.

The dialyzer 12 is supported by the plate 32 by means of a plurality of, here shown as four, rods 38 the lower ends of which are screwed into the clamping member 40 of the dialyzer 12. Each rod extends through a spacing tube 42 the opposite ends of which engage clamping member 40 and the inner surface of cover plate 32. Said cover plate is provided with a plurality of nipples 43 which are fixed in said cover plate and have opposite end portions projecting from the inner and outer surfaces thereof for the attachment thereto of flexible tubing 47 at the outer side of cover plate 32 and flexible tubing 45 at the inner side of said cover plate to provide tubular passages for the flow of the liquid streams into and out of the dialyzer at each side of the membrane thereof.

The dialyzer 12 is preferably of the construction shown and described in U.S. Patent Re. 24,736 issued November 17, 1959. Briefly described, the dialyzer comprises the companion plates 44 and 46 between which a semipermeable dialyzer membrane 48 is clamped (FIG. 6). The confronting surfaces of plates 44 and 46 are provided with continuous spiral grooves 50 and 52, respectively (FIG. 4), the groove 50 of plate 44 being in alignment with the groove 52 of the companion plate 46 and in mirror relation to the latter and separated from each other by the semi-permeable membrane 48. Plates 44 and 46 are provided with inlet nipples 54 and 56, respectively (FIG. 6), for the connection thereto of the fluid conducting tubes referred to above, and with outlet nipples 58 and 60, respectively, likewise provided for the connection of fluid conducting tubes thereto. Preferably, but not necessarily, the dialyzer comprises a plurality of dialyzer units each composed of a pair of said companion plates 44—46 and an interposed semi-permeable membrane 52, the outlet 58 of one of the plates 44 being connected to the inlet 54 of the other dialyzer plate 44, by a flexible tube 62 and the outlet 60 of one of the plates 46 being connected to the inlet nipple 56 of the other dialyzer plate 46 by the flexible tube 64. When a plurality of sets of dialyzer plates are employed, the outlet nipples 58 and 60 of the plates 44 and 46 of the last dialyzer are connected to two of the nipples 43 in the cover plate 32, and it will be understood that the other two nipples 43 of the cover plate 32 are provided for the connection of the fluid supply tubes to the opposite sides, respectively, of the first dialyzer, i.e., to the nipples 54 and 56, respectively, of the upper set of plates 44 and 46 as illustrated in FIGURE 6.

The dialyzer plates 44 and 46 are preferably translucent or transparent so that the flow of the fluids through the dialyzer may be readily observed and for that purpose are made of "Lucite" or other suitable plastic, and if desired, an observation window (not shown) may be provided in cover plate 32. The dialyzer plates are held in releasably clamped relation by a clamping rod 66 which extends through a central opening 68 in the dialyzer plate assembly, as clearly illustrated in FIGURE 3, which have the threaded portions shown engaged by nuts 70 and 72 for exerting clamping pressure against the above mentioned clamping plate 40 which engages the dialyzer plate 44 and against the clamping plate 74 against the dialyzer plate 46. Each of the clamping plates 40 and 74 is provided with a peripheral rib 76 which engages one side of a pressure plate 78 having a plurality of circumferentially spaced openings 80 therethrough whereby said plate 78 is somewhat flexible and is therefore operable to distribute the clamping pressure substantially evenly against the adjacent surface of the adjacent dialyzer plate, namely plate 44 in the case of clamping member 40 and the companion pressure plate 78, and plate 46 in the case of pressure member 76 and the companion pressure plate 78. When two sets of dialyzer plates are employed, a third pressure plate 78 is interposed between the adjacent dialyzer plates of the two sets for equalizing the clamping pressure on plate 46 of one set and the adjacent plate 44 of the other set. The clamping nut 72 is operable to exert its clamping pressure against the companion clamp member 74 through a ball bearing 81 which is interposed between said clamping nut 72 and a clamping member 82 the inner end surface of which frictionally engages the outer surface of clamping member 74. The provision of the ball bearing 81 between the clamping nut 72 and the friction member 82, which as illustrated in FIGURE 3 is not in engagement with clamping rod 66, facilitates the turning of the clamping nut 72 into and out of clamping relation to member 74, through bearing 81 and member 82, while at the same time being operative to provide an effective clamping action.

It will be noted by reference to FIGURE 3 that the inner surfaces 84 of the clamping members 40 and 74 are spaced from the adjacent ends of the companion pressure members 78, respectively, so that when the dialyzer assembly is immersed in the liquid in receptacle 10 there is a fluid passage through the central opening 68 through the spaces or clearances between the clamping members 40 and the companion pressure members 78 and through the openings 80 in said last mentioned members, respectively, so that the various surface portions of the dialyzer are exposed directly to the liquid in said receptacle 10 whereby to improve the isothermal characteristic of the dialyzer in the various parts thereof.

Pursuant to the present invention, according to the preferred embodiment thereof, provision is made for bringing the temperature of the fluid to a constant temperature before entering the dialyzer. For this purpose a coil 86 is interposed in the fluid line leading from the fluid supply for each side of the dialyzer. More particularly, a coil 86 is interposed in the conduit leading from one of the nipples 43 to the inlet nipple 54 of the dialyzer plate 44, and a similar coil is interposed between another nipple 43 and the inlet nipple 56 of the companion dialyzer plate 46. Each of said coils is immersed in the liquid L in the receptacle 10 so that as the fluid flows through said coil on its way to the dialyzer said fluid is at a uniform temperature substantially the temperature of the fluid within the dialyzer. Thus, coil 86 acts as a temperature equilibrating device in respect to the temperature of the fluid within the dialyzer. Coil 86 is preferably formed of glass and is in the form of a helix, but it will be understood that said coil may be formed of other materials inert to the fluids passing therethrough, and in respect to the broad aspects of the present invention it will be understood that said coil may be of a different configuration, although, the helical formation is advantageous and is therefore preferred. More specifically, in this connection, coil 86 also preferably constitutes a mixing coil for effecting a thorough mixture of a plurality of liquids which may be admitted to the inlet end of said coil in accordance with certain methods of analysis for which the dialyzer of the present invention is especially suitable for advantageous use. As illustrated by FIGS. 4 and 5 coils 86 are releasably mounted on a pair of spacing tubes 42. For this purpose coil 86 is mounted on a bar or strip 88 of a plastic or other suitable material, being releasably held in position on said bar by a spring strip 90 which is secured at one end 92 to said bar in any suitable way and which extends through the coil and holds the latter with spring pressure against the confronting surface of said bar. A spring member 94 is secured at one end 96 thereof to bar 88 and has a free end portion 98 at its opposite end, whereby spring strip 94 is effective to releasably engage a pair of supporting tubes 42, as clearly illustrated in FIGURE 4.

The receptacle 10 is provided with means for automatically replenishing liquid in the case of loss by evaporation or otherwise, during the operation of the apparatus. For this purpose, a bottle or other suitable receptacle 100 (FIGS. 2 and 3) is mounted in inverted position on cover 24 which is provided with an opening 102 through which the neck 104 of the bottle projects. It will be understood, of course, that the outer end of the bottle neck 104 is positioned at the desired level L' of the liquid in the receptacle so that when said level drops below the end 106 of the bottle neck, liquid from the bottle is automatically admitted, in a well understood way, in the receptacle until the level of liquid therein is restored. Bottle 100 is preferably translucent and for that purpose is made of glass or a suitable plastic, such as polyethylene, so that said bottle not only serves as means for providing a constant liquid level in receptacle 10 but also constitutes means to indicate when the liquid level in the receptacle 10 drops below the desired predetermined level, it being understood of course that if no liquid is visible in the bottle 100 it is an indication realized that the liquid level in the receptacle 10 is too low.

It will be noted that the dialyzer 12 and the parts assembled therewith, including the coils 86 may be inserted in the receptacle 10 and removed therefrom through opening 30, as a unit, including the tubes which connect the inner ends of the nipples 43 to the dialyzer. Also, as illustrated in FIGURE 7, it will be noted that when the dialyzer is positioned externally of the receptacle 10, the assembly including the cover plate 32 which is in unitary relation with the dialyzer 12 may be conveniently placed on a suitable support with the dialyzer plates and the clamping nut 72 uppermost. This arrangement greatly facilitates the disassembly and the assembly of the dialyzer plates and associated parts when it is desired to replace the dialyzer membrane, or to clean the dialyzer passages, or to connect the tubings thereto or for any other purpose.

In the above described form of the invention, the heater 14 and its thermal control 15, 17 are shown mounted as a unit with the stirrer motor 20, but if desired the heater 14 and its thermal control 15, 17 may be mounted as a unit separately from the motor 20. Also, if desired the water supply receptacle 100 may be of rectangular cross section so as to take up less room for the same volumetric capacity. When the heater 14 and the thermal control 15, 17 are mounted separately from the motor 20, this unit may be positioned at the location of the receptacle 100 illustrated by FIGURE 2 and the rectangular water supply receptacle may be positioned in the space between the stirrer motor and the heater and thermal control unit.

It will be noted that as illustrated in FIG. 3, the dialyzer is completely submerged in the liquid L, and accordingly a minute quantity of the liquid L comes in contact with the membrane of the dialyzer, by capillary attraction, between the dialyzer plates 44 and 46. While the quantity of water which thus comes in contact with the membrane is very small and hence does not affect the dialysis operation of the apparatus, it is sufficient to maintain the dialyzer membrane sufficiently moist to prevent the membranes from drying out, and for this reason the useful life of the membrane is considerably increased.

As illustrated by FIGS. 8 to 10, provision is made, pursuant to one of the objects of the present invention, for adjusting the temperature at which the dialysis operation is performed. The heated dialyzer in the apparatus illustrated by FIGS. 8 to 10 is mounted on a cover plate 32, in the same manner as illustrated by FIGS. 1 to 3. Said plate 32 is removably secured to a cover 24A for the liquid receptacle 10A. The liquid receptacle 10A, however, in this apparatus, is a thermally insulated receptacle and for that purpose comprises an inner receptacle 102 and a jacket 104 spaced from said inner receptacle and the space is filled with insulation material 106. The receptacle cover 24A is secured by means of screws 108 which engage in threaded openings in nuts 110 welded to the inner surface of outer receptacle 104. Peripherally continuous gaskets 112 are provided at the upper edges of receptacle 110 and jacket 104 to provide a fluid tight seal between cover 24A and the liquid receptacle and its jacket. The liquid supply bottle 100, the electric heater 14, the stirrer 16, the relay 17 and the stirrer motor 20, all referred to above, are all mounted on the normally stationary receptacle cover 24A. However, in lieu of a factory-set thermostatic device such as the device 15 described above, the apparatus provided in accordance with this aspect of the present invention includes an adjustably thermostatic device 112 of the contact thermometer type (hereinafter described). It will be understood that the relay 17 is operable under the control of thermostatic device 112 and is positioned within casing 22 secured on the top of cover 24A by screws or in any other suitable way. Also, as here shown, the stirrer-actuating motor 20 is carried by a bracket 114 secured to the receptacle cover 24A. The liquid supply bottle 100 is held in position by a plurality of posts 116 which are secured to cover 24A in upstanding relation thereto to removably receive said liquid supply bottle 100. Also, as illustrated by FIG. 8, a plurality of liquid mixing coils 86A, similar to the mixing coils 86, referred to above, are here shown mounted on cover 24A and are provided for optional use in addition to or in lieu of the mixing coils 86 previously referred to.

The adjustable thermostatic device 112 is mounted removably in position by means of a vertical metal tube 118 which is secured at its lower end in an opening 120 in cover 24A. Said device comprises a glass thermometer 122 which has a pool of mercury M in its lower part which projects into the liquid L when the thermometer is mounted in position. An electric contact member 124 is in contact with said mercury and is connected to a wire 126 which is connected in the control circuit (not shown) which comprises the relay 17. While said control circuit may be of any well known type, it is preferably of the specific type shown and described in the application of Milton H. Pelavin, Serial No. 765,183, filed concurrently herewith and assigned to the assignee of this application. The contact thermometer also comprises an adjustable contact member or electrode 128 which is adjustably movable longitudinally of the thermometer tube by a well known mechanical device which comprises a nut 130 in screw-threaded rod 132, said rod being held against longitudinal movement and said nut being held against rotary movement so that rotation of said rod is effective to move said nut longitudinally and thereby move the electrode 128 in relation to the upper surface of the mercury pool M. Rod 132 is rotatable by a magnetic adjusting device mounted on the housing 132 secured to the top of the thermometer tube in fluid tight relation therewith. The magnetic device comprises a permanent magnet 136 disposed within said housing in operative relation to the iron core or armature 138, whereby rotation of magnet 136 is effective to rotate said armature which is fastened to rod 132 for rotating the latter. An operating knob 140 is mounted for rotation in housing 134 and is disposed externally of the latter and connected to magnet 136 internally of said housing so that rod 132 can be readily actuated for adjusting the position of the electrode 128. It will be understood that the temperature at which the dialysis is performed is determined by the space between the upper surface of the mercury pool and the lower end of rod 132. It will be observed that the upper end of metal rod 132 projects through a metal sleeve 142 at the top of the contact member. A wire 144 is connected to said sleeve for connection in the control circuit as the return of wire 126. A contact thermometer of this general type is well known and is readily available on the market and does not per se form part of the present invention.

It will be noted that the lower end of the housing 134 rests on the top edge of tube 118 and the lower part of the thermometer is held in position by a resilient washer 145, the latter being preferably made of sponge rubber or resilient synthetic material having generally the same characteristics as sponge or foam rubber. The barrel of the thermometer 122 is provided with a calibrated scale in relation to which the electrode 128 is movable for setting the thermostatic device for operation at a predetermined temperature. In this connection, it will be noted that the thermometer may be readily removed from the supporting tube 118 for adjustment, repair or replacement.

Thus it will be seen that the invention described with reference to FIGS. 8 to 10 provides for operating the dialyzer at an adjustably predetermined temperature. Accordingly, in respect to this aspect of the invention, provision is not only made for maintaining a uniform rate of dialysis, but in addition, provision is made for adjusting the rate of dialysis by adjusting the temperature at which the dialyzer operation is performed. It will be understood that an insulated liquid receptacle such as that illustrated by FIGS. 8 and 9, may be utilized in lieu of the receptacle 10 described above with reference to FIGS. 1 to 6.

While the dialysis apparatus of the present invention may be used for various purposes in analysis or other processes, this apparatus is especially useful in practicing the method described in United States Patent No. 2,797,149 for Methods of and Apparatus for Analyzing Liquids Containing Crystalloid and Non-Crystalloid Constituents.

While I have shown and described the preferred mode of practicing the present invention it will be understood that this invention may be practiced otherwise and as herein specifically illustrated and described and that in the embodiment of the invention herein shown or described certain changes may be made therein and will occur to persons skilled in the art, in view of the present disclosure. Accordingly, I do not wish to be limited precisely to the invention as herein shown or described except to the extent which may be required by the scope of the claims.

This application is a continuation-in-part of my application, Serial No. 729,724, filed April 21, 1958, now U.S. Patent No. 3,028,965, issued April 10, 1962.

Having thus described my invention, what I claim and desire to secure by Letters Patent is:

1. Dialysis apparatus, comprising a dialyzer having companion plates and a membrane clamped between said plates and maintaining said plates in spaced relation so that the outer edge of said membrane is exposed along the periphery thereof, said dialyzer having a fluid inlet and a fluid outlet at each side of said membrane, a receptacle for a body of liquid, means for mounting said dialyzer within said receptacle for immersion in said body of liquid during the operation of the dialyzer so that said outer edge of said membrane is in contact with said liquid to maintain the dialyzer membrane in moist condition by capillary attraction of said membrane, fluid-supply conduit means extending into said receptacle and connected to said fluid inlets of said dialyzer at opposite sides, respectively, of its membrane, for conducting separate streams of fluid to the dialyzer, fluid-exhaust conduit means connected to said fluid outlet of said dialyzer at opposite sides, respectively, of its membrane for the flow of the fluid streams from the dialyzer and extending out of said receptacle, and means for maintaining said body of liquid at a substantially uniform temperature in order to maintain the rate of dialysis substantially constant.

2. Dialysis apparatus, comprising a dialyzer having companion plates and a membrane clamped between said plates and maintaining said plates in spaced relation so that the outer edge of said membrane is exposed along the periphery thereof, said dialyzer having a fluid inlet and a fluid outlet at each side of said membrane, a receptacle for a body of liquid, means for mounting said dialyzer within said receptacle for immersion in said body of liquid during the operation of the dialyzer so that said outer edge of said membrane is in contact with said liquid to maintain the dialyzer membrane in moist condition by capillary attraction of said membrane, fluid-supply conduit means extending into said receptacle and connected to said fluid inlets of said dialyzer at opposite sides, respectively, of its membrane, for conducting separate streams of fluid to the dialyzer, fluid-exhaust conduit means connected to said fluid outlet of said dialyzer at opposite sides, respectively, of its membrane for the flow of the fluid streams from the dialyzer and extending out of said receptacle, and means for maintaining said body of liquid at a substantially uniform temperature in order to maintain the rate of dialysis substantially constant, said last mentioned means comprising a heater for the liquid in said receptacle, a stirrer immersed in said liquid for maintaining said liquid in motion, a liquid contact thermometer for controlling the operation of said heater, and a hollow tubular member supported on said receptacle, said contact thermometer being removably mounted in said tubular member with the lower end of said thermometer immersed in said liquid.

References Cited in the file of this patent

UNITED STATES PATENTS

| | | |
|---|---|---|
| 1,838,336 | Uehling | Dec. 29, 1931 |
| 2,025,534 | Sheard et al. | Dec. 24, 1935 |
| 2,227,938 | Krebs | Jan. 7, 1941 |
| 2,252,213 | Skolnik | Aug. 12, 1941 |
| 2,720,879 | Gasca et al. | Oct. 18, 1955 |
| 2,864,507 | Isreeli | Dec. 16, 1958 |

OTHER REFERENCES

American Instrument Company Catalog 48, page 10, copyright 1948, American Instrument Co., Silver Spring, Maryland.

Lowsley et al.: "Artificial Kidney: Preliminary Report." The Journal of Urology; February 1951; vol. 65, No. 2, pp. 163–75.